United States Patent
Henry et al.

(10) Patent No.: US 10,860,909 B2
(45) Date of Patent: Dec. 8, 2020

(54) MODULAR RADIO FREQUENCY IDENTIFICATION (RFID) DEVICES

(71) Applicant: HEWLETT-PACKARD DEVELOPMENT COMPANY, L.P., Houston, TX (US)

(72) Inventors: Shaun Henry, Boise, ID (US); Gregory Doyle Creager, Boise, ID (US); Jonathan Neuneker, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/091,537

(22) PCT Filed: Apr. 5, 2016

(86) PCT No.: PCT/US2016/026033
§ 371 (c)(1),
(2) Date: Oct. 5, 2018

(87) PCT Pub. No.: WO2017/176257
PCT Pub. Date: Oct. 12, 2017

(65) Prior Publication Data
US 2019/0130238 A1    May 2, 2019

(51) Int. Cl.
*G06K 19/07* (2006.01)
*G06K 19/077* (2006.01)

(52) U.S. Cl.
CPC ..... *G06K 19/0717* (2013.01); *G06K 19/0723* (2013.01); *G06K 19/0772* (2013.01);
(Continued)

(58) Field of Classification Search
None
See application file for complete search history.

(56) References Cited

U.S. PATENT DOCUMENTS 5,798,171 A * 8/1998 Olson ............... H01L 23/3735
                                                174/138 G
7,012,504 B2 * 3/2006 Tuttle ............... G06K 19/0716
                                                340/10.1
(Continued)

FOREIGN PATENT DOCUMENTS

WO    WO-2010000806    1/2010

OTHER PUBLICATIONS

Catarinucci, Luca, et al., "Prototyping Flexible UHF RFID Tags Through Rapid and Effective Unconventional Techniques: Validation on Label-Type Sensor-Tag", IEEE 2012 International Conference on RFID—Technologies and Applications, 6 pages.
(Continued)

*Primary Examiner* — K. Wong
(74) *Attorney, Agent, or Firm* — Michael A. Dryja (57) ABSTRACT

Example implementations relating to a modular radio frequency identification (RFID) device are described. For example, the modular RFID device includes a modular circuit pad and a modular transmission pad coupled to the modular circuit pad. The modular circuit pad includes a processing circuit to process data and the processing circuit includes multiple circuit electrical contacts. Further, the modular transmission pad includes a transmission circuit to transmit the data. The transmission circuit includes multiple transmission electrical contacts detachably connected to the multiple circuit electric contacts.

17 Claims, 3 Drawing Sheets

(52) U.S. Cl.
CPC . *G06K 19/07749* (2013.01); *G06K 19/07754* (2013.01); *G06K 19/07758* (2013.01)

(56) References Cited

U.S. PATENT DOCUMENTS

| | | | | |
|---|---|---|---|---|
| 7,377,446 | B2* | 5/2008 | Ohta | G06K 19/077 |
| | | | | 235/379 |
| 7,433,655 | B2* | 10/2008 | Jacobs | A61N 1/3787 |
| | | | | 320/101 |
| 8,044,508 | B2* | 10/2011 | Jenson | A61N 1/3787 |
| | | | | 257/666 |
| 8,077,042 | B2 | 12/2011 | Peeters | |
| 9,660,606 | B2* | 5/2017 | Lyalin | H01F 27/2804 |
| 9,697,459 | B2* | 7/2017 | Finn | B23K 26/361 |
| 2006/0290512 | A1 | 12/2006 | Shanton | |
| 2009/0058652 | A1 | 3/2009 | Hardy et al. | |
| 2009/0294542 | A1 | 12/2009 | Rogy et al. | |
| 2011/0011939 | A1* | 1/2011 | Seah | G06K 19/07749 |
| | | | | 235/492 |
| 2013/0270348 | A1 | 10/2013 | Zenz et al. | |
| 2014/0247118 | A1 | 9/2014 | Kovacic et al. | |
| 2016/0034807 | A1 | 2/2016 | Forster | |

OTHER PUBLICATIONS

Yang, Li, et al., "RFID Tag and RF Structures on a Paper Substrate Using Inkjet-Printing Technology", IEEE Transactions on Microwave Theory and Techniques, vol. 55, No. 12, Dec. 2007 8 pages.
Yoshihisa, Tomoki, et al., "A Rule-Based RFID Tag System Using Ubiquitous Chips", May 19-21, 2005, http://ieeexplore ieee org/xpl/articleDetails jsp?arnumber=1505388&queryText= LB RFID B.

* cited by examiner

MODULAR RADIO FREQUENCY IDENTIFICATION (RFID) DEVICES

BACKGROUND

Radio frequency (RF) communication is a widely used mode of communication for short range exchange of information and finds application in large number of fields. Few examples of applications of RF communications include data sensing, object tracking, data authentication and remote control operations. RF communications are generally performed by utilizing an RFID device and a RFID reader. The RFID device is either attached to an object to store identification data of the object or placed within an environment to capture data and subsequently transmit the data to the RFID reader.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference, like features and components.

DETAILED DESCRIPTION

Radio Frequency Identification (RFID) devices generally include multiple radio frequency (RF) circuits, such as processing circuit and transmission circuits to store and transmit data to RFID readers. Generally, techniques of fabricating the RFID devices include embedding multiple RF circuits into a substrate and interconnecting such RF circuits for data communication. The fabrication of the RFID devices is time consuming, complex and involves substantial investment.

Further, replacement or addition of new RF circuits to an existing RFID device to either repair the RFID device or to enhance capability of the RFID device is difficult due to hardwired interconnections within the RF circuits. Thus, generally, the RFID devices, once fabricated, provide predefined capabilities and are also not easily repairable.

In accordance with an example implementation of the present subject matter, modular RFID devices including modular RF pads, such as modular circuit pads and modular transmission pads are described. The modular RF pads facilitate creation of the modular RFID devices which allows flexibility in replacing RF pads, thereby enabling enhancements in capabilities of the RFID device along with easy and convenient repairs.

In an implementation of the present subject matter, a modular RFID device includes a modular circuit pad and a modular transmission pad, interconnected through a device connecting layer. The modular circuit pad includes a processing circuit disposed on a surface of the modular circuit pad to receive and process data. For example, the processing circuit may be a sensing circuit for capturing sensor data, such as ambient temperature and light from an environment.

The processing circuit includes multiple circuit electrical contacts, such that the multiple circuit electrical contacts can be connected to other RF pads. In an example implementation, the multiple circuit electrical contacts of the modular circuit pad are connected with the modular transmission pad to enable relay of the data between the modular circuit pad and the modular transmission pad. In an example, the multiple circuit electrical contacts may be detachably connected to the modular transmission pad such that the multiple circuit electrical contacts may also be separated from the modular transmission pad and attached to another modular transmission pad from time to time.

In another example implementation of the present subject matter, the modular transmission pad includes a transmission circuit to receive the data from the processing circuit and transmit the data to a RFID reader. The transmission circuit further includes multiple transmission electrical contacts disposed on a surface of the modular transmission pad such that the multiple transmission electrical contacts can be connected to electrical contacts of another RF pad.

In an example implementation, the multiple transmission electrical contacts are detachably connected to the multiple circuit electrical contacts to enable the relay of data between the processing circuit and the transmission circuit. The device connecting layer may be disposed in between the surface of the modular transmission pad and the surface of the modular circuit pad to attach the modular transmission pad and the modular circuit pad. In an example, the device connecting layer may have adhesive property or magnetic property for attaching the modular circuit pad and modular transmission pad together through surface contact.

The implementation of the multiple circuit electrical contacts on the modular circuit pads and the multiple transmission electrical contacts on the transmission pads along with the device connecting layer enables replacement of faulty RF pads along with addition of new RF pads to the modular RFID device effortlessly. Thus, the modular RFID device provides the flexibility of replacing RF pads for repairability of the RF pads and incorporating new RF pads for enhancing capability of the modular RFID device.

The above described modular RF device is further described with reference to FIG. 1 to 3. It should be noted that the description and figures merely illustrate the principles of the present subject matter along with examples described herein and, should not be construed as a limitation to the present subject matter. It is thus understood that various arrangements may be devised that, although not explicitly described or shown herein, include the principles of the present subject matter. Moreover, all statements herein reciting principles, aspects, and examples of the present subject matter, as well as examples thereof, are intended to encompass equivalents thereof.

Figure 1:
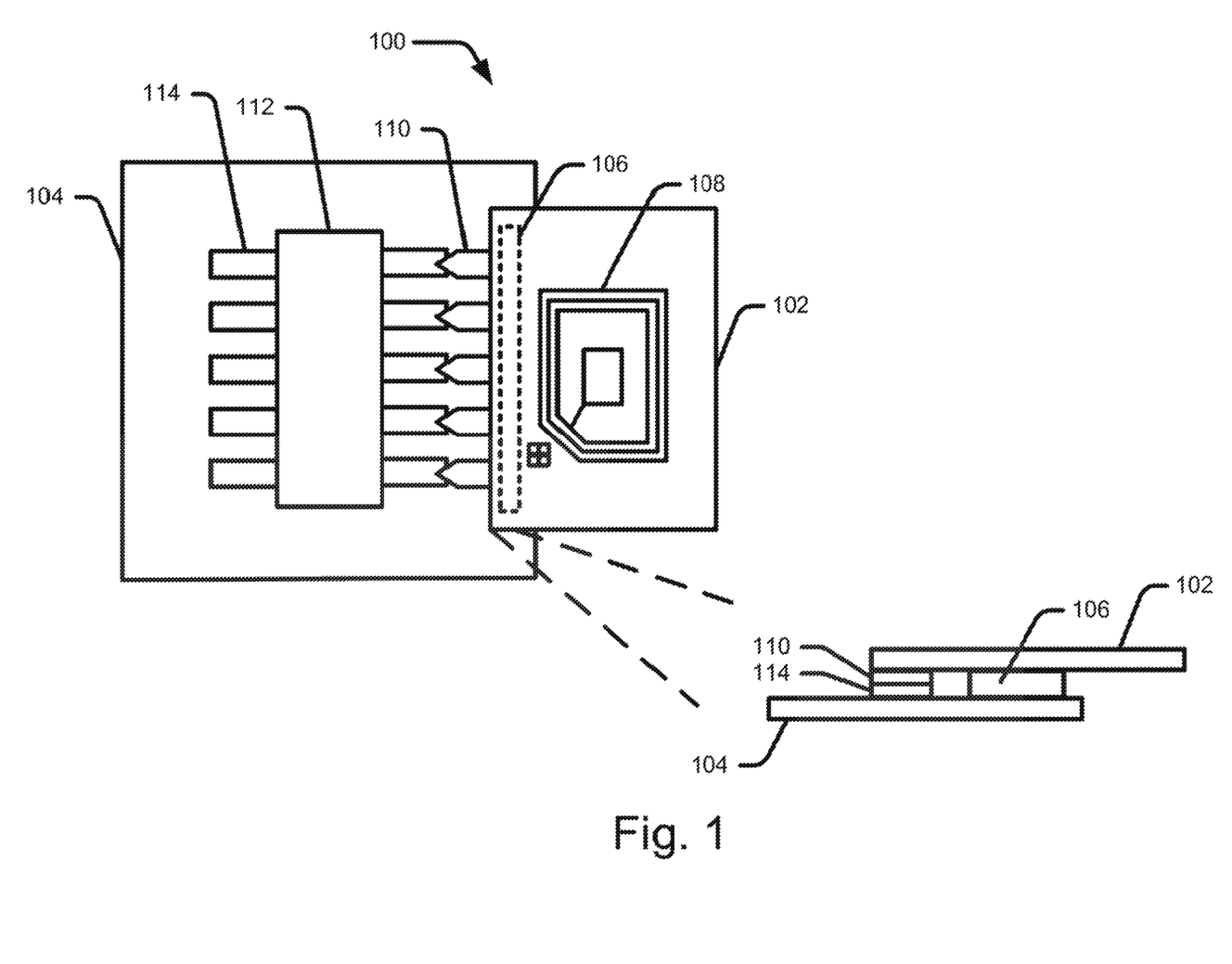
FIG. 1 illustrates a schematic representation of a modular Radio Frequency Identification (RFID) device, according to an implementation of the present subject matter.

FIG. 1 illustrates a schematic representation of a modular RFID device 100 according to an example implementation of the present subject matter. The modular RFID device 100 may be one of a RFID tag, a RFID card, a RFID label, and a RFID sticker. In another example implementation, the modular RFID device 100 may be one of an active RFID device with an on board power supply and a passive RFID device, and may operate in any one of a low frequency (LF) band, a high frequency (HF) band or an ultra-high frequency (UHF) band.

In an example implementation, the modular RFID device 100 may include a modular transmission pad 102, and a modular circuit pad 104 coupled to the modular transmission pad 102 through a device connecting layer 106.

The modular transmission pad 102 may be a RF pad for transmitting and receiving data from other RF pads, such as the modular circuit pad 104 and RFID readers (not shown), through RF signals. The modular transmission pad 102 may include a transmission circuit 108 disposed on surface of the modular transmission pad 102. The transmission circuit 108 may include an antenna circuit to transmit and receive the data wirelessly.

In an example, the transmission circuit 108 may receive power from an on board power supply to transmit and receive the data, when the modular RFID device 100 is an active RFID device. In another example, the transmission circuit 108 may receive power from a RFID reader to transmit and receive the data when the modular RFID device 100 is a passive RFID device. In an implementation, the transmission circuit 108 may be one of a planar antenna circuit, a loop antenna circuit, and a linear antenna circuit.

In an example implementation, the transmission circuit 108 may include multiple transmission electrical contacts 110 disposed on the surface of the modular transmission pad 102. The multiple transmission electrical contacts 110 may be disposed such that the multiple transmission electrical contacts 110 can be connected to another RF pad, such as the modular circuit pad 104 through surface contact.

The multiple transmission electrical contacts 110 may be in form of pins, wired terminals, or metal contacts that can be connected to pins, wired terminals, and metal contacts of another RF pad to complete an electrical circuit and enable transmission of the data to an external entity, such as the RFID reader.

Further, the modular circuit pad 104 may be a printed circuit pad to perform various functions, such as sensing data from an environment, storing information corresponding to an object, and processing the data as per requisites of an application. For performing one of such functions, the modular circuit pad 104 may include a processing circuit 112 disposed on surface of the modular circuit pad 104.

In an example implementation, the processing circuit 112 may be a sensing circuit to sense data from the environment and may be of different types based on application of the modular circuit pad 104. For example, the modular circuit pad 104 may be utilized for sensing light in a room and accordingly the processing circuit 112 may be a light sensing circuit to monitor light in the room and capture data related to intensity of the light. In another example, the modular circuit pad 104 may be utilized for sensing temperature of an object. In the example, the processing circuit 112 may be a temperature sensing circuit to monitor temperature of the object and capture temperature data.

In an example implementation, the processing circuit 112 may be a data processing circuit including an integrated circuit and a memory to store the data. For example, the data may be an employee code of an employee of a company. The employee code may be unique code assigned to the employee to monitor and record in and out time of the employee from the company's premises. The employee code may be stored within memory of the processing circuit 112 embedded within an identity card or badge of the employee.

In an example implementation of the present subject matter, the processing circuit 112 may include multiple circuit electrical contacts 114 disposed on surface of the modular circuit pad 104. The multiple circuit electrical contacts 114 may be disposed such that the multiple transmission electrical contacts 110 can be detachably connected to the multiple circuit electrical contacts 114 through surface contact of the modular circuit pad 104 and the modular transmission pad 102.

The multiple circuit electrical contacts 114 may be in form of pins, wired terminals, or metal contacts that can be connected to pins, wired terminals, and metal contacts of another RF pad, such as the modular transmission pad 102 to complete the electrical circuit and enable relay of the data to the other RF pad.

The device connecting layer 106 may attach and hold the modular transmission pad 102 and modular circuit pad 104 together as a unit. The device connecting layer 106 may attach the two RF pads such that the multiple transmission electrical contacts 110 and multiple circuit electrical contacts 114 may be coupled to each other. In an example, the device connecting layer 106 may either be an adhesive layer or a magnetic layer.

In an example implementation, the device connecting layer 106 may include a transmission connecting layer and a circuit connecting layer. The transmission connecting layer may be disposed on the surface of the modular transmission pad 102 and the circuit connecting layer may be disposed on the surface of modular circuit pad 104.

In an example implementation of the present subject matter, the modular transmission pad 102 may be detachably connected to the modular circuit pad 104 such that the modular transmission pad 102 and the modular circuit pad 104 can be detached from each other and attached to any other RF pad with ease. For example, the modular circuit pad 104 may be attached to other modular transmission pads and the modular transmission pad 102 may be attached to other modular circuit pad for performing a different function.

Further, if the modular circuit pad 104 may have erroneous operation due to a fault in the processing circuit 112, then the modular circuit pad 104 may be replaced with a new modular circuit pad 104. In this manner, the modular circuit pad 104 may be repaired with ease. Therefore, the modular RFID device 100 provides high availability and replaceability of the RF pads.

In an example, to perform more functions by the modular RFID device 100, additional modular circuit pads may be coupled to the modular transmission pad 102. Also, in another example implementation of the present subject matter additional modular transmission pads may be coupled to the modular circuit pad 104 to transmit the data to additional RFID readers.

In an example implementation of the present subject matter, the modular circuit pad 104 may include multiple sets of the multiple circuit electrical contacts 114 disposed on different portions of the modular circuit pad 104. The multiple sets of the multiple circuit electrical contacts 114 may be such that each set of multiple circuit electrical contacts 114 may connect to a set of multiple transmission electrical contacts of a modular transmission pad. In this manner, multiple modular transmission pads may be connected to one modular circuit pad 104 at different portions and each modular transmission pad may transmit the data to a RFID reader. Such a combination of modular circuit pad 104 with multiple modular transmission pads may enable simultaneous transmission of the data to multiple RFID readers.

In another example implementation, the modular transmission pad 102 may include multiple sets of multiple transmission electrical contacts 110 disposed on different portions of the modular transmission pad 102. The multiple sets of the multiple transmission electrical contacts 110 may be such that each set of the multiple transmission electrical contacts 110 may connect to a set of multiple circuit electrical contacts of a modular circuit pad.

Therefore, multiple modular circuit pads may be connected to the modular transmission pad 102 at different portions. The multiple modular circuit pads may enable processing different types of data at a time. For example, a first modular circuit pad may process light data, a second modular circuit pad may process temperature data and a third modular circuit pad may process radiation data.

In operation, the modular RFID device 100 may function as an environment sensor with the three modular circuit pads connected to one modular transmission pad 102. Each modular circuit pad may capture respective data from the environment. For example, the first modular circuit pad may capture light data, the second modular circuit pad may capture temperature data, and the third modular circuit pad may capture radiation data. After capturing the data, each modular circuit pad may relay the data to the modular transmission pad 102.

In an example, the data may be relayed to the modular transmission pad 102 in a sequence starting from the first modular circuit pad to the third modular circuit pad one after another. After receiving the data, the modular transmission pad 102 may transmit the data to the RFID reader. In an example, the transmission pad 102 may append a header to the data during transmission of the data to the RFID reader. The header may include details associated with the data, such as time stamp of capturing the data, type of data, and source of the data.

It would be noted that the data may have different attributes, such as format and size and, to efficiently process and transmit the data, the modular transmission pad 102, the modular circuit pad 104 and the RFID reader may be compatible with each other in processing the data. For example, the data transmitted by the modular transmission pad 102 may be an 8 bit data corresponding to intensity of light, appended with the header. In the example, the modular transmission pad 102 and the RFID reader may be capable of processing the 8 bit data along with the appended header.

In an example implementation of the present subject matter, the modular RFID device 100 may also comprise a switching module to regulate relay of data between the modular transmission pad 102 and the modular circuit pad 104. The switching module may regulate the transmission of data by either switching on and off the connection between the two pads or selectively relaying the data from the modular circuit pad 104 to the modular transmission pad 102.

In an example, the switching module may comprise a set of logic gates in form of a multiplexer to selectively relay data from the processing circuit 112 to the transmission circuit 108 based on a switching signal. In another example, the switching module may be a digital switch, such as a Complimentary Metal Oxide Semiconductor (CMOS) switch to regulate the relay of data. Further, the switching module may include switches of different types, for example a signal switch, a load switch, or an application specific switch.

In an aspect, the modular transmission pad 102 may be connected to the multiple modular circuit pads through the switching module. The multiple circuit pads may be connected to the input of the multiplexer and the modular transmission pad 102 may be coupled to the output of the multiplexer. The multiplexer may determine one modular circuit pad from the multiple modular circuit pads to be connected to the modular transmission pad 102 based on the switching signal, to relay the data. Accordingly, different modular circuit pads may be connected to the modular transmission pad 102 at different instances to relay respective data.

In another example implementation, the modular RFID device 100 may include the modular circuit pad 104 connected to multiple modular transmission pads through the switching module. In such a combination, the multiple modular transmission pads may be connected to the input of the multiplexer and the modular circuit pad 104 may be coupled to output of the multiplexer.

The multiplexer may determine one modular transmission pad from the multiple modular transmission pads to be connected to the modular circuit pad 104 based on the switching signal. Accordingly, different modular transmission pads may be connected to the modular transmission pad 102 at different instances to transmit the data to respective RFID readers. In a similar manner, multiple circuit pads may be connected to multiple transmission pads through the switching module.

It would be noted that utilization of the switching module in between the modular transmission pad 102 and the modular circuit pad 104 may prevent continuous relay of data to the transmission pad 102 and transmission of the data to the RFID reader thereby conserving power and reducing data redundancy at the RFID reader.

In an example, the modular RFID device 100 can be created by printing the modular transmission pads and the modular circuit pads on separate substrates and then attaching the modular transmission pads and the modular circuit pads in different combinations. In an example, the modular RFID device 100 may be created using a digital printing technique, such as 3D printing, laser printing, ink printing, label printing, photo printing, magazine printing and newspaper printing. For printing the modular circuit pad 104 and the modular transmission pad 102, various substrates such as latex foam, paper fiber, paper, cardboard, plastic film, and foil may be used.

Figure 2:
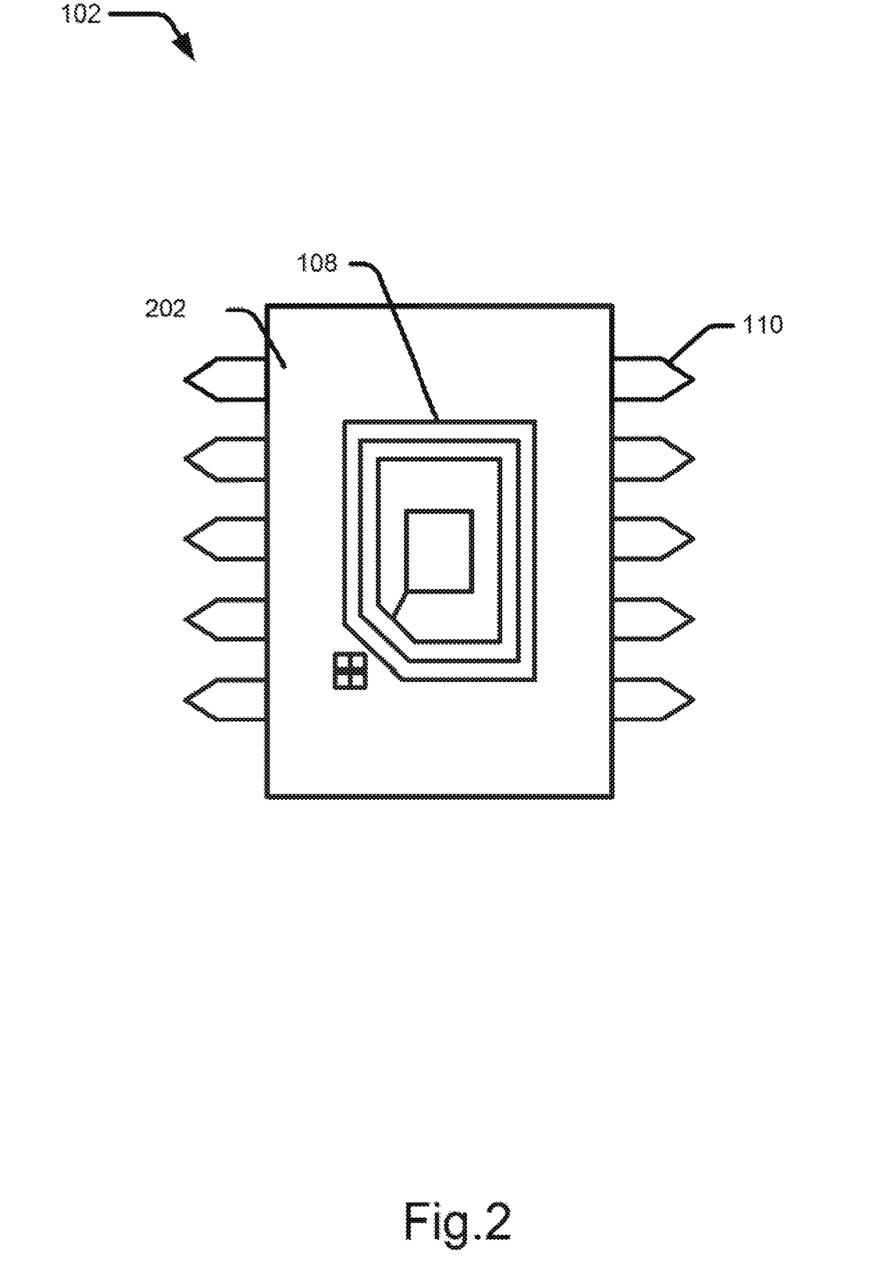
FIG. 2 illustrates a schematic representation of a modular transmission pad, according to an implementation of the present subject matter.

The detailed explanation of the modular transmission pad 102 and functionalities have been further explained in conjunction with description of FIG. 2.

FIG. 2 schematically illustrates a modular transmission pad 102, according to an example implementation of the present subject matter. In the example implementation, the modular transmission pad 102 may include a transmission substrate 202, the transmission circuit 108 and the multiple transmission electrical contacts 110.

In an example implementation, the transmission substrate 202 may be a printable substrate to embed the transmission circuit 108. For example, the transmission substrate 202 may be one of latex foam, a paper fiber, a paper, a cardboard, a plastic film, a foil, polyethylene terephthalate (PET), polyethylene naphthalate (PEN), and polyimide (PI). The transmission substrate 202 may be printed with the transmission circuit 108 using any known printing technique, such as 3D printing, laser printing, ink printing, photo printing, magazine printing and newspaper printing.

In an example implementation, the transmission circuit 108 may be a printed electronic circuit on the transmission substrate 202 to receive the data from the modular circuit pad 104 connected to the modular transmission pad 102, and transmit the data to the RFID reader using RF signals. The transmission circuit 108 may include one of a planar antenna, a loop antenna, and a linear antenna to perform the transmission of the data. The transmission circuit 108 may further be coupled with the multiple transmission electrical contacts 110.

The multiple transmission electrical contacts 110 may have a predefined alignment based on size, and shape of the multiple transmission electrical contacts 110. Further, the predefined alignment may define a preset value of distance between the multiple transmission electrical contacts 110. The predefined alignment of the multiple transmission electrical contacts 110 may ensure that modular circuit pads with multiple circuit electrical contacts having same alignment can safely connect with the multiple transmission electrical contacts 110.

In an example implementation, the modular transmission pad 102 may include a transmission connecting layer disposed on the transmission substrate 202. The transmission connecting layer may enable attaching the modular transmission pad 102 to the modular circuit pad 104. In an example, the transmission connecting layer may be one of an adhesive layer and a magnetic layer.

In an aspect, the transmission connecting layer may facilitate detachable attachment of the modular transmission pad 102 with the modular circuit pad 104. For example, the transmission connecting layer may enable the modular transmission pad 102 to attach with a modular circuit pad 104 and then detach from the modular transmission pad 102. In the example, the modular transmission pad 102 may be attached with the modular circuit pad 104 such that the multiple transmission electrical contacts 110 may be coupled with the multiple circuit electrical contacts 114 and data stored in the modular circuit pad 104 may be transmitted. Thereafter, the transmission connecting layer may enable the modular transmission pad 102 to connect to another modular circuit pad such that data stored in the other modular circuit pad may be transmitted to the RFID reader. For example, the modular transmission pad 102 may be connected to a modular circuit pad for light sensing. In such a connection, the multiple transmission electrical contacts 110 may be coupled to the multiple circuit electrical contacts 114 of the modular circuit pad 104 to transmit light data. The modular transmission pad 102 may then be detached from the modular circuit pad 104 for light sensing and may be attached to another modular circuit pad 104 for temperature sensing. The modular transmission pad 102 may then transmit temperature data to the RFID reader.

In an example implementation of the present subject matter, the modular transmission pad 102 may be detached from the modular circuit pad 104 such that the multiple transmission electrical contacts 110 may be decoupled from the multiple circuit electrical contacts 114.

In another example, the modular transmission pad 102 including the transmission circuit 108 may be attached to a human body part, such as fingers, hands, and toes of the user through an adhesive back surface. Further, the modular circuit pad 104 may be attached to any open surface, such as on buttons of a keyboard, on a mouse, on a home appliance, and on a wall. In an example, the modular circuit pad 104 may have an adhesive back surface for attaching the modular circuit pad 104 on the open surface.

To transmit the data, the user may tap the body part with the modular transmission pad 102 against the modular circuit pad 104. When the body part is tapped, the multiple transmission electrical contacts 110 may connect with the multiple circuit electrical contacts 114 of the modular circuit pad 104 to complete an electric circuit. Thereafter, the data may be received by the modular transmission pad 102 from the modular circuit pad 104 and transmitted to the RFID reader.

In the example, the transmission circuit 108 of the modular transmission pad 102 may function as a contact switch for selectively transmitting data to the RFID reader. Therefore, continuous transmission of data to the RFID reader may be prevented thereby conserving power and reducing data redundancy at the RFID reader.

Such a modular transmission pad 102 may be used for variety of applications. For example, in one application, the modular transmission pad 102 may be utilized to perform a function of a button on a keyboard. For performing the function of the button, the modular circuit pad 104 may be placed on the button by manually pasting the modular circuit pad 104 on the button through the adhesive back surface.

When the user may tap the button with the finger having the modular transmission pad 102, then the multiple transmission electrical contacts 110 may couple with the multiple circuit electrical contacts 114 to complete the electric circuit and transmit RF signal of a predefined frequency having the data to the RFID reader. The RFID reader may receive the RF signal and activate a RFID controller. The RFID controller may then perform the function of the button.

In other applications, the modular circuit pad 104 and the modular transmission pad 102 may be used as a button to operate various home appliances, such as switching on or off a microwave oven, switching on or of heating of coffee in a coffee mug, and switching on or off of a fan, an air conditioner or a heater in a room.

Further, the modular transmission pad 102 may be conveniently replaced with another modular transmission pad when the modular transmission pad 102 may have erroneous operation. For example, the transmission circuit 108 in the modular transmission pad 102 may have a fault and therefore may transmit incorrect data or may not be able to transmit the data. In such an example, the modular transmission pad 102 may be replaced with a new modular transmission pad having another transmission circuit. The new modular transmission pad may then transmit the correct data efficiently.

Thus, the modular transmission pad 102 may provide reusability and replaceability of RF pads thereby providing high availability of the RF pads. Further, the modular transmission pad 102 may provide customizability by conveniently attaching to different modular circuit pads with different applications and transmitting data associated with the modular circuit pads.

In an example implementation, the modular transmission pad 102 may include a switching module coupled to the transmission circuit 108 and the processing circuit 112. The switching module may regulate relay of data between the modular circuit pad 104 and the modular transmission pad 102.

Figure 3:
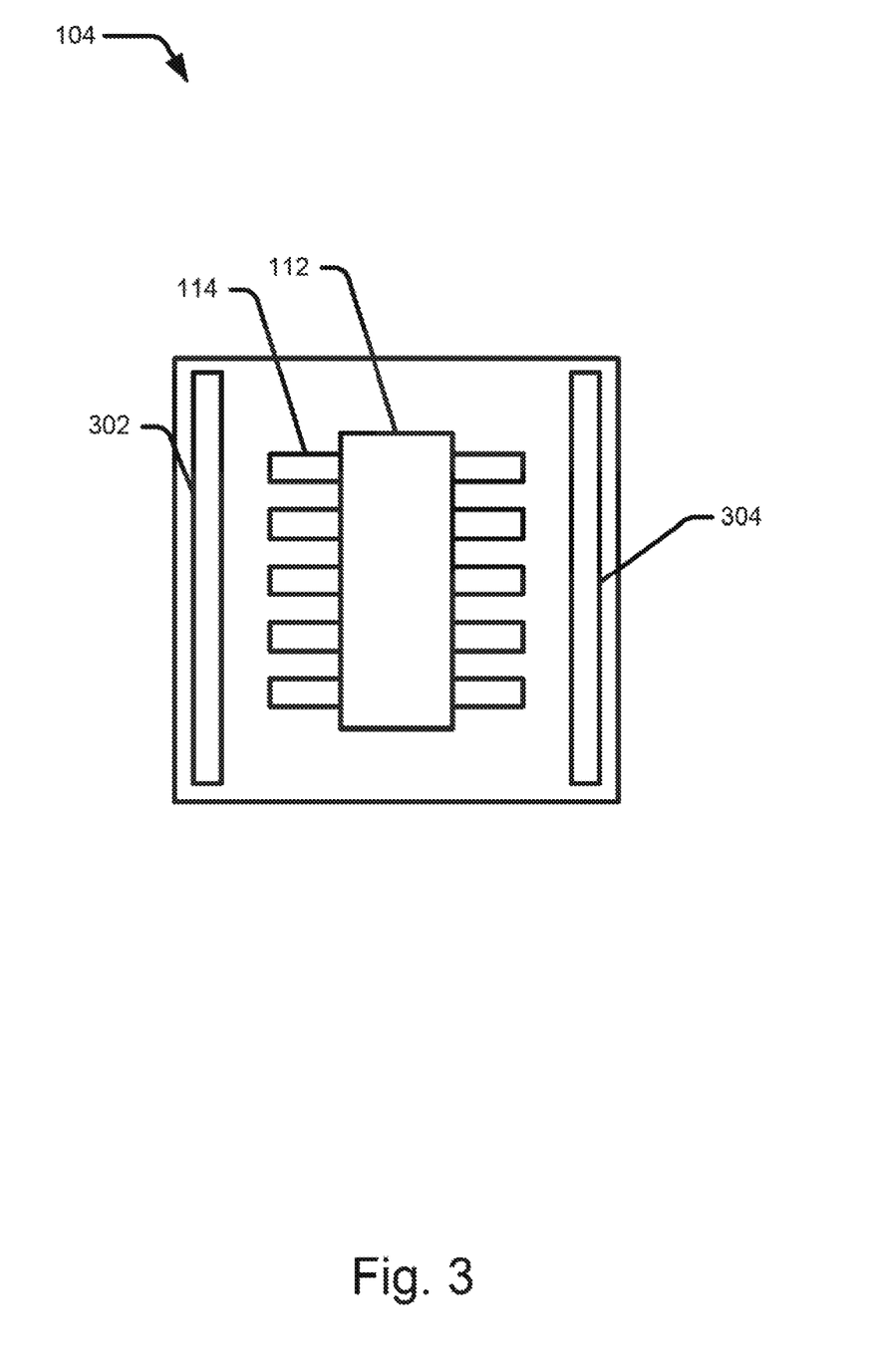
FIG. 3 illustrates a schematic representation of a modular circuit pad, according to an implementation of the present subject matter.

FIG. 3 illustrates a schematic representation of the modular circuit pad 104, according to an example implementation of the present subject matter. In an example implementation, the modular circuit pad 104 may include a circuit substrate 302, the processing circuit 112, the multiple circuit electrical contacts 114 and the circuit connecting layer 304.

In an example implementation, the circuit substrate 302 may be a printable substrate to embed the processing circuit 112. For example, the circuit substrate 302 may be one of latex foam, a paper fiber, a paper, a cardboard, a plastic film, a foil, polyethylene terephthalate (PET), polyethylene naphthalate (PEN), and polyimide (PI). The circuit substrate 302 may be printed with the processing circuit 112 using a printing technique, such as 3D printing, laser printing, ink printing, photo printing, magazine printing and newspaper printing.

The processing circuit 112 may be a printed electronic circuit on the circuit substrate and may perform different functions, such as storing data, capturing the data from an environment, compressing the data, and converting the data into a format readable by the RFID reader.

In an example, the processing circuit 112 may be one of a microcontroller, a processor, and an Application Specific Integrated Circuit (ASIC). In an example, the processing circuit 112 may be a sensing circuit to collect the data from the environment, such as a temperature sensor, a radiation sensor, a RF sensor, a light sensor, and a proximity sensor.

In another example, the processing circuit 112 may be printed on either one side of the modular circuit pad 104 or on both sides of the modular circuit pad 104. Further, the processing circuit 112 may be coupled with multiple circuit electrical contacts 114.

The multiple circuit electrical contacts 114 may have a predefined alignment and geometry that may include size, shape of the multiple circuit electrical contacts 114. Further, the predefined alignment may define a preset value of distance between the multiple circuit electrical contacts 114. The predefined alignment of the multiple circuit electrical contacts 114 may ensure that modular transmission pads with transmission electrical contacts having same alignment can safely connect with the multiple circuit electrical contacts 114.

The circuit connecting layer 304 may be disposed on the circuit substrate 302 to attach and hold the modular circuit pad 104 together with another RF pad, such as the modular transmission pad 102. In an example, the circuit connecting layer 304 may be an adhesive layer or a magnetic layer.

In an aspect, the modular circuit pad 104 may be detachably attached to the modular transmission pad 102 such that the modular circuit pad 104 may be detached from the modular transmission pad 102 and connected to another modular transmission pad. For example, the modular circuit pad 104 may be a temperature sensor and pasted on surface of a milk bottle to sense temperature of milk. Thereafter, when the modular transmission pad 102 may come in contact with the modular circuit pad 104, the temperature data may be transmitted to the RFID reader, for example, within a mobile device of the user. The user may then determine whether the milk is suitable for drinking based on the temperature data.

In the example, the modular circuit pad 104 may be detached from the milk bottle and pasted on surface of a coffee mug to determine temperature of the coffee inside the coffee mug.

Further, the modular circuit pad 104 may be conveniently replaced with another modular circuit pad when the modular circuit pad 104 may have erroneous operation. For example, the processing circuit 112 in the modular circuit pad 104 may have a fault and therefore may capture incorrect data or may not be able to store the data. In such an example, the modular circuit pad 104 may be replaced with a new modular circuit pad having another processing circuit. The new modular circuit pad may then capture the correct data or store the data efficiently.

Thus, the modular circuit pad 104 may provide reusability and replaceability thereby providing high availability and repairability of the RF pads. Further, the modular circuit pad 104 may provide customizability to the users.

In an example, the modular circuit pad 104 may be in different shapes and sizes based on an intended application. For example, for attaching the modular circuit pad 104 on human body parts of the user, the modular circuit pad 104 can be circular, oval, or a shape with rounded edges and corners. The modular circuit pad 104 can have a square, rectangular or other rectilinear shape for use on surfaces, such as desktops, mice, keyboards, monitors, walls, floors, and the like. In another example, the size and shape of the modular circuit pad 104 may be customized according to user intent, such as shape of symbols, alphabets, letters and smileys.

Although implementations of present subject matter have been described in language specific to structural features, it is to be understood that the present subject matter is not necessarily limited to the specific structural features described. Rather, the specific features are disclosed and explained in the context of a few implementations for the present subject matter.

What is claimed is:

1. A modular RFID device comprising:
   a modular circuit pad comprising a processing circuit to process data, the processing circuit comprising a plurality of circuit electrical contacts;
   a modular transmission pad comprising a transmission circuit to wirelessly transmit the data, the transmission circuit comprising a plurality of transmission electrical contacts detachably connected to the circuit electric contacts and over which the data is received from the modular circuit pad; and
   a device connecting layer between the modular circuit pad and the modular transmission pad and separate from the transmission and circuit electrical contacts to removably attach the modular circuit pad with the modular transmission pad, permitting replacement of the modular circuit pad with another modular circuit pad and replacement of the modular transmission pad with another modular transmission pad.

2. The modular RFID device as claimed in claim 1 further comprising a switching module coupled to the processing circuit and the transmission circuit to regulate relay of data between the modular circuit pad and the modular transmission pad.

3. The modular RFID device as claimed in claim 1, wherein the processing circuit is at least one of a sensing circuit to collect data, and a data processing circuit to store data.

4. The modular RFID device as claimed in claim 1, wherein the modular transmission pad is to couple to a plurality of modular circuit pads, wherein each of the plurality of modular circuit pads process distinct type of data.

5. The modular RFID device as claimed in claim 1, wherein the modular circuit pad is to couple to a plurality of modular transmission pads to simultaneously transmit data to multiple RFID readers.

6. The modular RFID device as claimed in claim 1, wherein the device connecting layer comprises:
   a transmission connecting layer disposed on a transmission substrate of the modular transmission pad to attach the plurality of transmission electrical contacts to the plurality of circuit electrical contacts; and
   a circuit connecting layer disposed on a circuit substrate of the modular circuit pad to attach the plurality of circuit electrical contacts to the plurality of transmission electrical contacts.

7. A modular transmission pad for Radio Frequency (RF) communication, the modular transmission pad comprising:
   a transmission substrate;
   a transmission circuit disposed on a surface of the transmission substrate, the transmission circuit comprising a plurality of transmission electrical contacts to detachably connect to a plurality of circuit electrical contacts of a modular circuit pad comprising a processing circuit to process data, wherein the transmission circuit is to wirelessly transmit the data received over the transmission electrical contacts; and a transmission connecting layer separate from the transmission electrical contacts and disposed on the transmission substrate to removably attach the modular transmission pad with the modular circuit pad, permitting replacement of the modular circuit pad with another modular circuit pad and replacement of the modular transmission pad with another modular transmission pad.

8. The modular transmission pad as claimed in claim 7, wherein the transmission connecting layer is at least one of an adhesive layer and a magnetic layer.

9. The modular transmission pad as claimed in claim 7, further comprising a switching module coupled to the transmission circuit and the processing circuit corresponding to the modular circuit pad, to regulate relay of data between the modular circuit pad and the modular transmission pad.

10. The modular transmission pad as claimed in claim 7, wherein the transmission circuit is at least one of a planar antenna, a loop antenna, and a linear antenna to receive data from the at least one modular circuit pad and transmit the data.

11. A modular circuit pad for RF communication, the modular circuit pad comprising:

a circuit substrate;

a processing circuit disposed on a surface of the circuit substrate to process data, the processing circuit comprising a plurality of circuit electrical contacts to detachably connect to a plurality of transmission electrical contacts of a modular transmission pad comprising a transmission circuit to wirelessly transmit the data received over the transmission electrical contacts; and a circuit connecting layer separate from the circuit electrical contacts and disposed on the circuit substrate to removably attach the modular circuit pad with the modular transmission pad, permitting replacement of the modular circuit pad with another modular circuit pad and replacement of the modular transmission pad with another modular transmission pad.

12. The modular circuit pad as claimed in claim 11, wherein the plurality of circuit electrical contacts have a predefined alignment based on size of the plurality of circuit electrical contacts, shape of the plurality of circuit electrical contacts, and a preset value of distance between the plurality of circuit electrical contacts.

13. The modular circuit pad as claimed in claim 11, wherein the processing circuit is printed on the circuit substrate.

14. The modular circuit pad as claimed in claim 11 is at least one of a temperature sensor, a radiation sensor, a RF sensor and a light sensor.

15. The modular circuit pad as claimed in claim 11, wherein the circuit connecting layer is at least one of an adhesive layer and a magnetic layer.

16. The modular RFID device as claimed in claim 1, wherein the device connecting layer comprises an adhesive layer.

17. The modular RFID device as claimed in claim 1, wherein the device connecting layer comprises a magnetic layer.

* * * * *